(12) United States Patent  
Roth

(10) Patent No.: US 7,811,050 B2
(45) Date of Patent: Oct. 12, 2010

(54) OPERATING LINE CONTROL OF A COMPRESSION SYSTEM WITH FLOW RECIRCULATION

(75) Inventor: Bryce Alexander Roth, West Chester, OH (US)

(73) Assignee: General Electric Company, Schenectady, NY (US)

( * ) Notice: Subject to any disclaimer, the term of this patent is extended or adjusted under 35 U.S.C. 154(b) by 837 days.

(21) Appl. No.: 11/646,813

(22) Filed: Dec. 28, 2006

(65) Prior Publication Data

US 2008/0155989 A1 Jul. 3, 2008

(51) Int. Cl.
*F01D 17/02* (2006.01)
(52) U.S. Cl. .................. 415/58.5; 415/116; 415/144; 415/118
(58) Field of Classification Search ............. 415/118, 415/58.5, 58.7, 116, 144, 191, 914
See application file for complete search history.

(56) References Cited

U.S. PATENT DOCUMENTS

| 5,782,603 | A | * | 7/1998 | O'Brien et al. | 415/1 |
| 5,984,625 | A | * | 11/1999 | Murray et al. | 415/1 |
| 6,027,304 | A | * | 2/2000 | Arar et al. | 415/116 |
| 6,125,626 | A | * | 10/2000 | El-Aini et al. | 60/226.1 |
| 6,481,210 | B1 | * | 11/2002 | Chapman | 60/772 |
| 6,557,400 | B2 | * | 5/2003 | Xiong et al. | 73/112.06 |

* cited by examiner

*Primary Examiner*—Ninh H Nguyen
(74) *Attorney, Agent, or Firm*—V G Ramaswamy; William Scott Andes; General Electric Company

(57) ABSTRACT

A system for controlling the operating lines of a gas turbine engine comprising a compression system which compresses an incoming flow of a gas, a bleed system which extracts gas from a bleed location in the compression system prior to the gas entering a throttling orifice, a recirculation system which reintroduces at least a portion of the gas extracted by the bleed system into a feed location in the compression system or upstream from it, a control system which controls the recirculated gas such that the operating lines of the compression system are changed such that the stall margin of the compression system is increased.

20 Claims, 8 Drawing Sheets

OPERATING LINE CONTROL OF A COMPRESSION SYSTEM WITH FLOW RECIRCULATION

BACKGROUND OF THE INVENTION

This invention relates generally to gas turbine engines, and, more specifically, to the compression modules therein, such as the fan, booster and the compressor.

In a turbofan aircraft gas turbine engine, air is pressurized in a fan module and a compression module during operation. The air passing through the fan module is mostly passed into a by-pass stream and used for generating the bulk of the thrust needed for propelling an aircraft in flight. The air channeled through the compression module is mixed with fuel in a combustor and ignited, generating hot combustion gases which flow through turbine stages that extract energy therefrom for powering the fan and compressor rotors. The fan, booster and compressor modules have a series of rotor stages and stator stages. The fan and booster rotors are typically driven by a low pressure turbine and the compressor rotor is driven by a high pressure turbine. The fan and booster rotors are aerodynamically coupled to the compressor rotor although these normally operate at different mechanical speeds.

Fundamental in the design of compression systems, such as fans, boosters and compressors, is efficiency in compressing the air with sufficient stall margin over the entire flight envelope of operation from takeoff, cruise, and landing. However, compression efficiency and stall margin are normally inversely related with increasing efficiency typically corresponding with a decrease in stall margin. The conflicting requirements of stall margin and efficiency are particularly demanding in high performance jet engines that require increased auxiliary power extraction, while still requiring high a level of stall margin in conjunction with high compression efficiency.

Operability of a compression system in a gas turbine engine is traditionally represented on an operating map with inlet corrected flow rate along the X-axis and the pressure ratio on the Y-axis, such as for example, shown in FIG. 1 for a fan. In FIG. 1, operating lines 14, 16 and the stall line 12 are shown, along with constant speed lines 22, 24. Line 24 represents a lower speed line and line 22 represents a higher speed line. In conventional designs, as the fan is throttled at a constant speed, such as constant speed line 24, the inlet corrected flow rate decreases while the pressure ratio increases, and the booster operation moves closer to the stall line 12. Furthermore, each operating condition has a corresponding compressor efficiency, conventionally defined as the ratio of actual compressor work input to ideal (isentropic) work input required to achieve a given pressure ratio. The compressor efficiency of each operating condition is conventionally plotted on the compressor map in the form of contours of constant efficiency, such as items 18, 20 shown in FIG. 1. The performance map has a region of peak efficiency, depicted in FIG. 1 as the smallest contour 20, and that for economic reasons it is desirable to operate the compressor in the region of peak efficiency as much as possible.

The operating line of a compressor is set by its downstream throttling orifice. It is known in the art that enlarging the throttling orifice will affect a lowering or drop in operating line 16 while a reduction in orifice area will cause an upward shift of the operating line. In conventional designs the throttle area is varied so as to place the operating line along the ridge of peak efficiency. This is not possible in applications in which the throttle area, such an exhaust nozzle, is fixed and cannot be varied.

In conventional designs, efficiency is usually sacrificed in order to achieve improved operability and increased stall margin. This is particularly challenging to achieve in applications having significant inlet distortion, high altitude operation or high auxiliary power extraction. In applications that require the use of fixed area nozzles, the attainment of adequate stability margin by lowering the component operating lines may seriously compromise engine performance. It is desirable to have a means of improving the stall margin of compression systems apart from simply lowering the operating line and sacrificing efficiency.

Conventional remedies available to improve engine operability include use of overboard bleed and variable position stators. The former is a relatively simple and effective solution, but requires the provision of some overboard bleed pathway. This may be undesirable for some applications wherein penetrations of the vehicle outer mold lines are to be avoided. Variable position stators can be effective at improving stall characteristics, but are mechanically complex and expensive.

In order to avoid a stall, it is desirable in fans, boosters and compressors in a gas turbine engines with fixed nozzle aperture to have means to control the operating line such that sufficient stall margin with respect to the stall line 12 is maintained before a stall initiates without sacrificing efficiency, for a wide operating range. It is desirable to have a method and means for controlling the operating line of a compression system having a fixed area throttling orifice downstream. It is desirable to have a compression system with operating lines to affect highest possible cruise performance and still have high levels operability over a wide range of operating conditions of altitude, power extraction, and inlet distortion.

BRIEF DESCRIPTION OF THE INVENTION

A system for controlling the operating lines of a gas turbine engine comprising a compression system which compresses an incoming flow of a gas, a bleed system which extracts gas from a bleed location in the compression system prior to the gas entering a throttling orifice, a recirculation system which reintroduces at least a portion of the gas extracted by the bleed system into a feed location in the compression system or upstream from it, a control system which controls the recirculated gas such that the operating lines of the compression system are changed such that the stall margin of the compression system is increased.

BRIEF DESCRIPTION OF THE DRAWINGS

The subject matter which is regarded as the invention is particularly pointed out and distinctly claimed in the concluding part of the specification. The invention, in accordance with preferred and exemplary embodiments, together with further objects and advantages thereof, is described in the following detailed description taken in conjunction with the accompanying drawings in which:

DETAILED DESCRIPTION OF THE INVENTION

Figure 1:
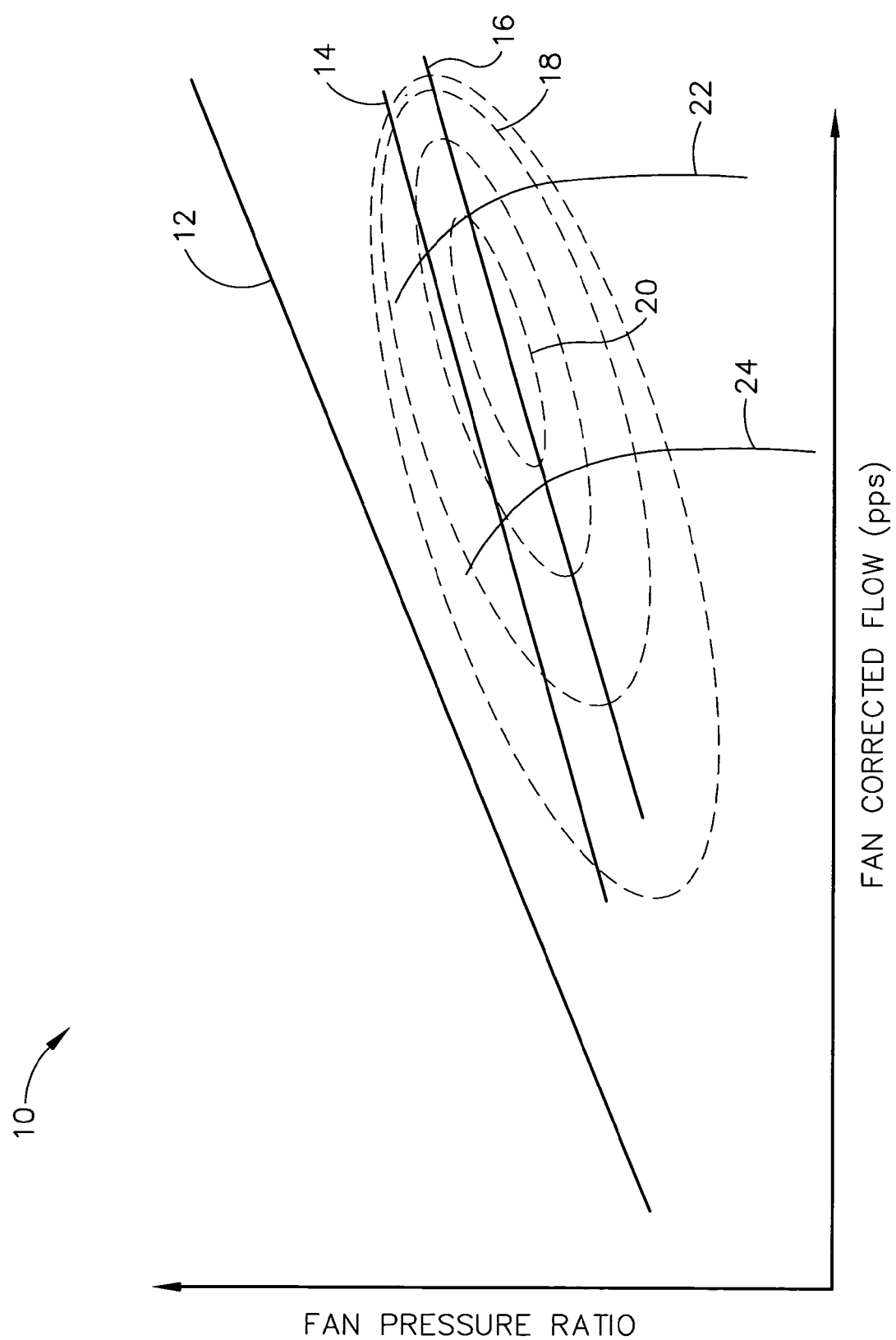
FIG. 1 is an exemplary fan operating map for a gas turbine engine according to the present invention.

Referring to the drawings wherein identical reference numerals denote the same elements throughout the various views, FIG. 1 is an exemplary fan operating map for a gas turbine engine according to the present invention. The "operating line" of a compression system, such as a fan, booster or compressor, is defined as the locus of steady state operating conditions as compression system speed is varied over its useable operating range. Two elements are key to fully define an operating line, these being a compression system, such as for example a fan 150 or compressor 160 shown in FIGS. 2 and 3, with prescribed performance characteristics in serial connection with a downstream throttling orifice, such as an exhaust nozzle 145, having prescribed characteristics, as shown in FIG. 1.

Figure 2:
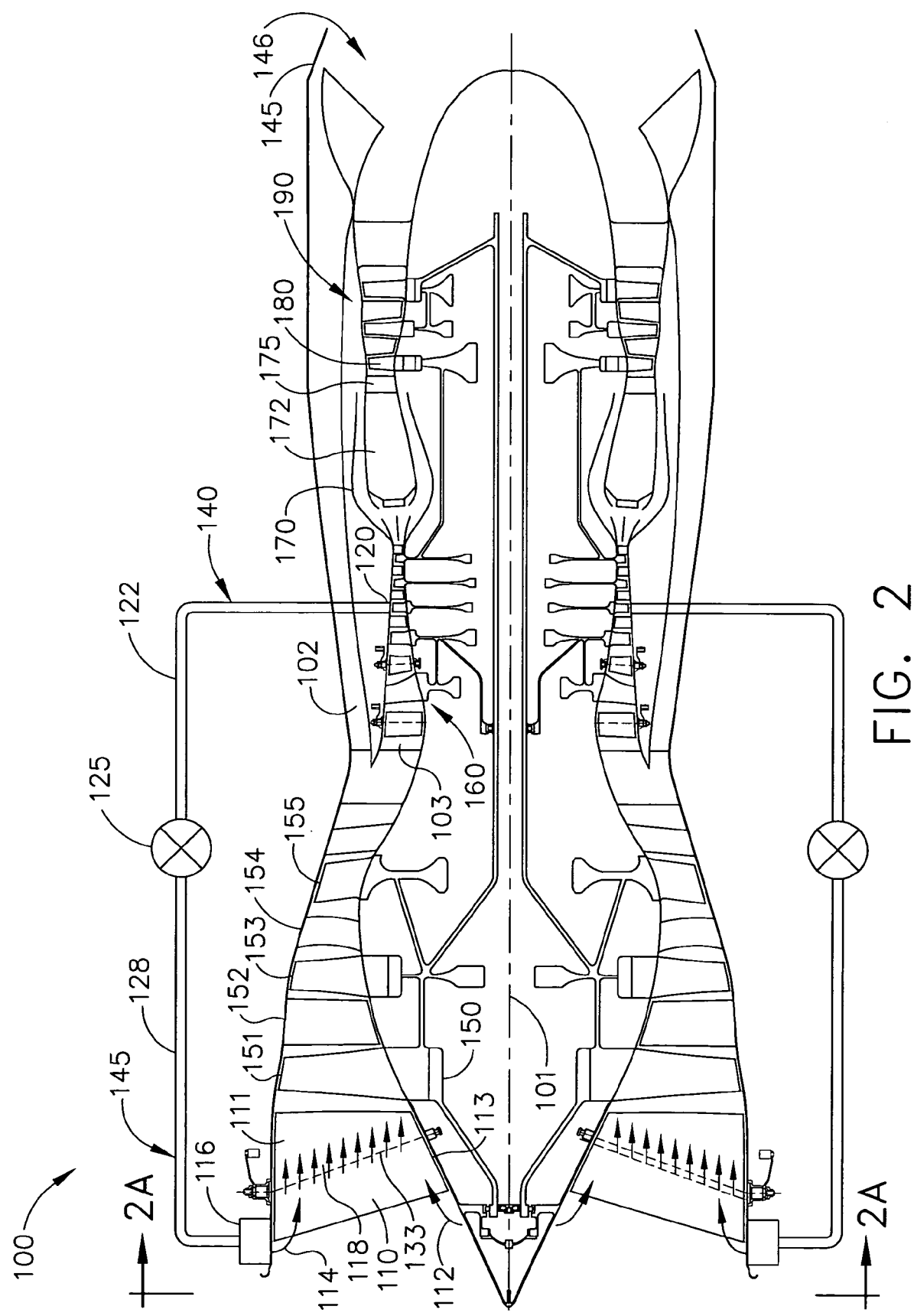
FIG. 2 is a longitudinal cross sectional view illustration of a gas turbine engine incorporating the preferred embodiment of the present invention with compressor bleed.
Figure 2A:
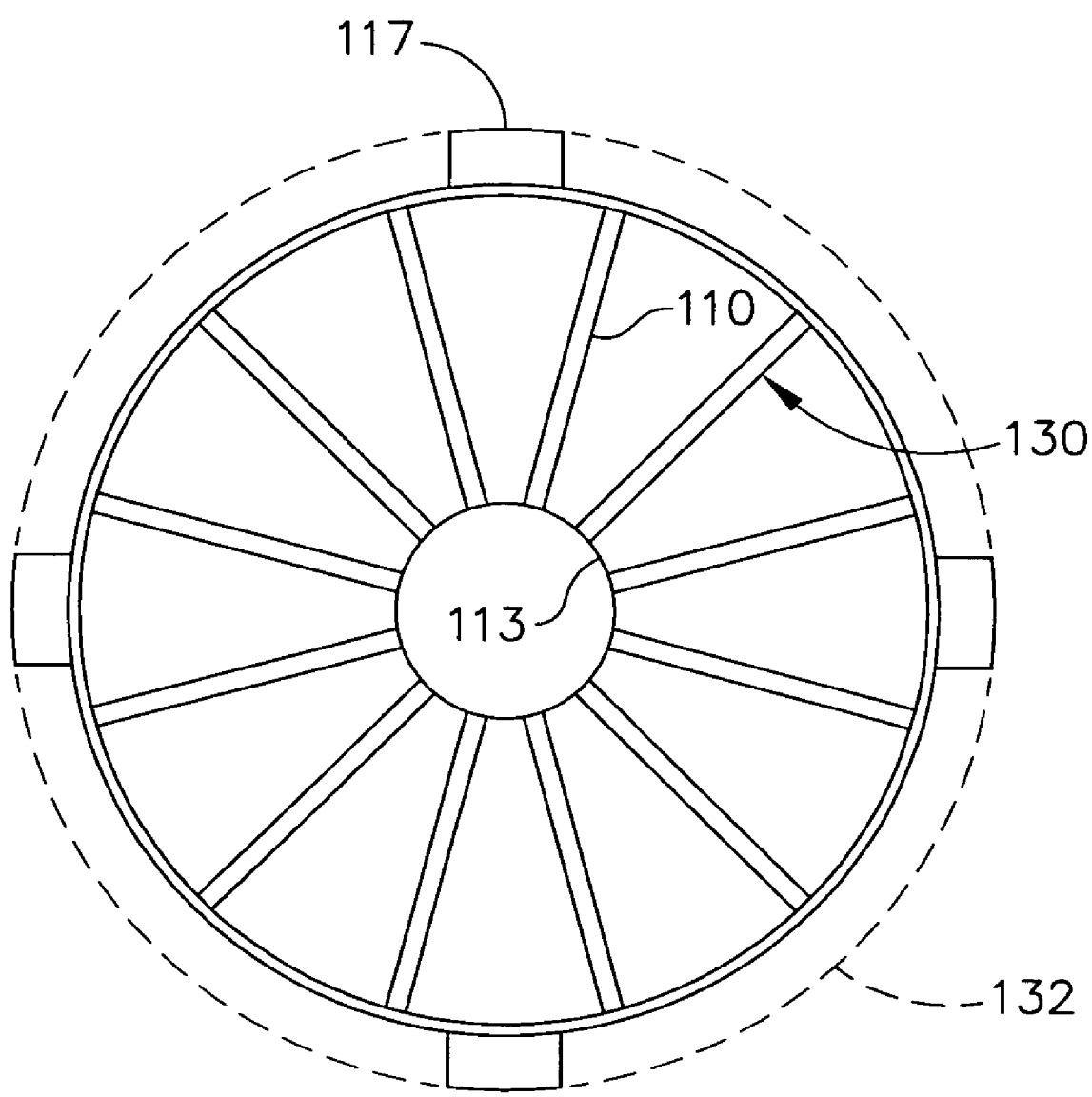
FIG. 2A is a forward-looking-aft view of the gas turbine engine shown in FIG. 2.

Illustrated in FIG. 2 is a longitudinal cross section of a gas turbine engine 100 comprising a fan 150, a compressor 160, a combustor 170, a high pressure turbine 180, a low pressure turbine 190, a front frame 130 and an exhaust nozzle 145. The fan 150 and the compressor 160 are configured for channeling and pressurizing an incoming gas flow to a bypass fan flow stream 102 and a compressor flow stream 103. A booster (not shown) which pressurizes the air flowing through the core prior to its entry into the compressor 160 is can be used. The fan, booster, compressor, and turbines are axisymmetrical about a longitudinal centerline axis 101.

The front frame includes a plurality of struts 110 spaced in a circumferential direction around the longitudinal centerline axis 101. The struts 110 sometimes have a plurality of inlet guide vanes (IGV) 111.

The fan comprises one or more fan stages each comprising a plurality of fan blades 151, 153, 155 arranged in a circumferential direction in the fan rotor around the longitudinal centerline axis 101. Axially aft of each rotor stage, is a stator stage having a plurality of stator vanes 152, 154.

The compressor 160 also includes multiple rotor stages and corresponding stator stages. The compressor rotor blades extend radially outwardly from a rotor hub or corresponding rotors in the form of separate disks, or integral blisks, or annular drums in any conventional manner. The rotor blades and stator vanes define airfoils having corresponding aerodynamic profiles or contours for pressurizing the air flow successively in axial stages. In operation, pressure of the air is increased as the air decelerates and diffuses through the stator and rotor airfoils.

Although the compression system is described here in term of axial flow fan and axial flow compressors, the concepts, principles, systems and advantages of the recirculation system for operating line control are applicable to other compression systems also, such as centrifugal compressors.

The preferred embodiment of the invention is shown in FIG. 2. It comprises of a bleed system and means 140 which has a series of compressor bleed ports 122 that extract a portion of the compressed gas from a bleed location 120 near an intermediate compression stage. Alternatively, the compressed gas may be extracted from a bleed location downstream from the exit side of the compression system. The flow of the gas in the compressor bleed ports 122 is controlled by a valve system 125, preferably one capable of modulating the air flow. The valve system 125 is also connected to recirculation system and means 145 which comprises a series of one or more ducts 128 that transfer bleed gas to a forward location, a manifold 116 and a front frame 130. The front frame 130 is constructed with the manifold 116 integrated into its outer periphery and comprises a set of hollow struts 110 that pass through the primary flowpath and are attached to a central hub. The struts 110 may have moveable flaps 111, also known as inlet guide vanes (IGVs), attached to their trailing edges. The recirculation system also has feed location 133 having a series of apertures, holes or passages that allow flow communication 114 between the manifold 116 and the primary flowpath. These holes are preferably arranged around the outer periphery of the flowpath 114, along the trailing edges of the struts 118, and along the inner periphery of the flowpath 112 so as to reintroduce the selected quantity of the flow extracted back into the flowpath as uniformly as possible to avoid introducing any additional distortion of flow at the inlet. Additionally, the holes may also be arranged in a manner so as to control some of the effects of inlet distortion on engine operation.

While the preferred means of reintroducing recirculated flow is through the front frame 130 as described above, other possible ways of reintroducing recirculated flow are also contemplated by the present invention, such as for example, reintroducing the recirculated flow upstream of the front frame 130 through feed locations 133 having ports located in the walls of the engine inlet and/or through struts passing through the inlet flowpath. Additionally, these holes may also be arranged in a manner so as to control some of the effects of the inlet distortion on engine operation.

Figure 3:
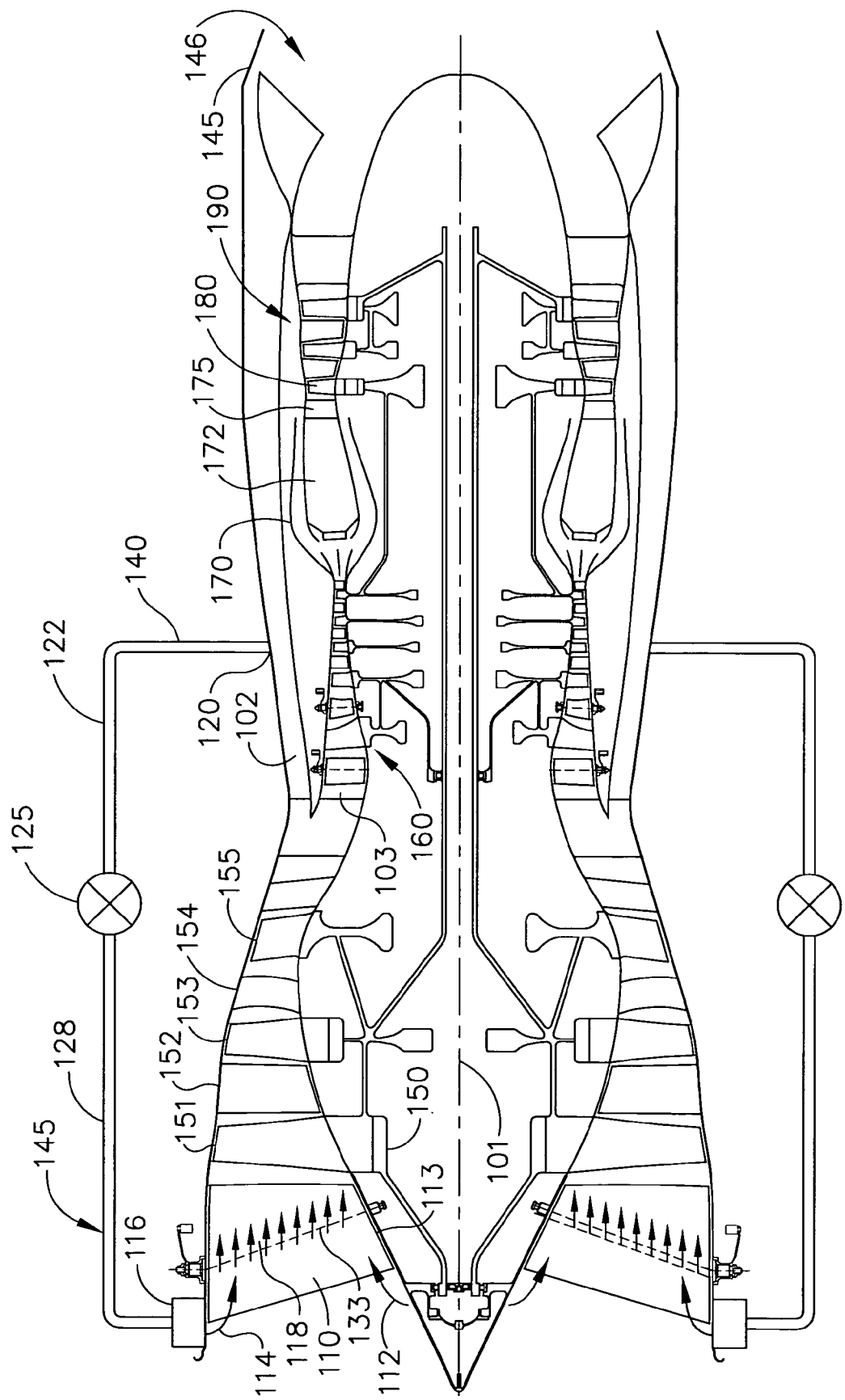
FIG. 3 is a longitudinal cross sectional view illustration of a gas turbine engine incorporating an alternate embodiment of the present invention showing fan bleed.

An alternate embodiment of the invention is shown in FIG. 3. In this embodiment, the recirculation air is extracted from the fan discharge path. It comprises of a bleed system 140 which has a series of bleed ports 122 that extract a portion of the compressed gas from the fan discharge path. This embodiment has the advantage that it uses cooler air from the fan discharge path, thereby easing mechanical design difficulties in the front frame as well as reducing the temperature distortions in the reintroduced air.

In fan 150 or compressor 160 systems, such as shown in FIG. 2 and FIG. 3, the operating line of each of these systems is set by a downstream throttling orifice from the particular compression system. In the case of the fan 150, the nozzle throat 146 of the exhaust nozzle 145 is a throttling orifice. In the case of the compressor 160, the high pressure turbine nozzle 175 plays the role of the throttling orifice. It is recognized by those skilled in the art that the heat introduced in the combustor 172 (between the compressor discharge and its throttling orifice) will have an impact on setting compressor and fan operating lines and these factors are normally accounted for in selecting orifice size. However, the same fundamental considerations in selecting operating line as described herein still apply.

Figure 4:
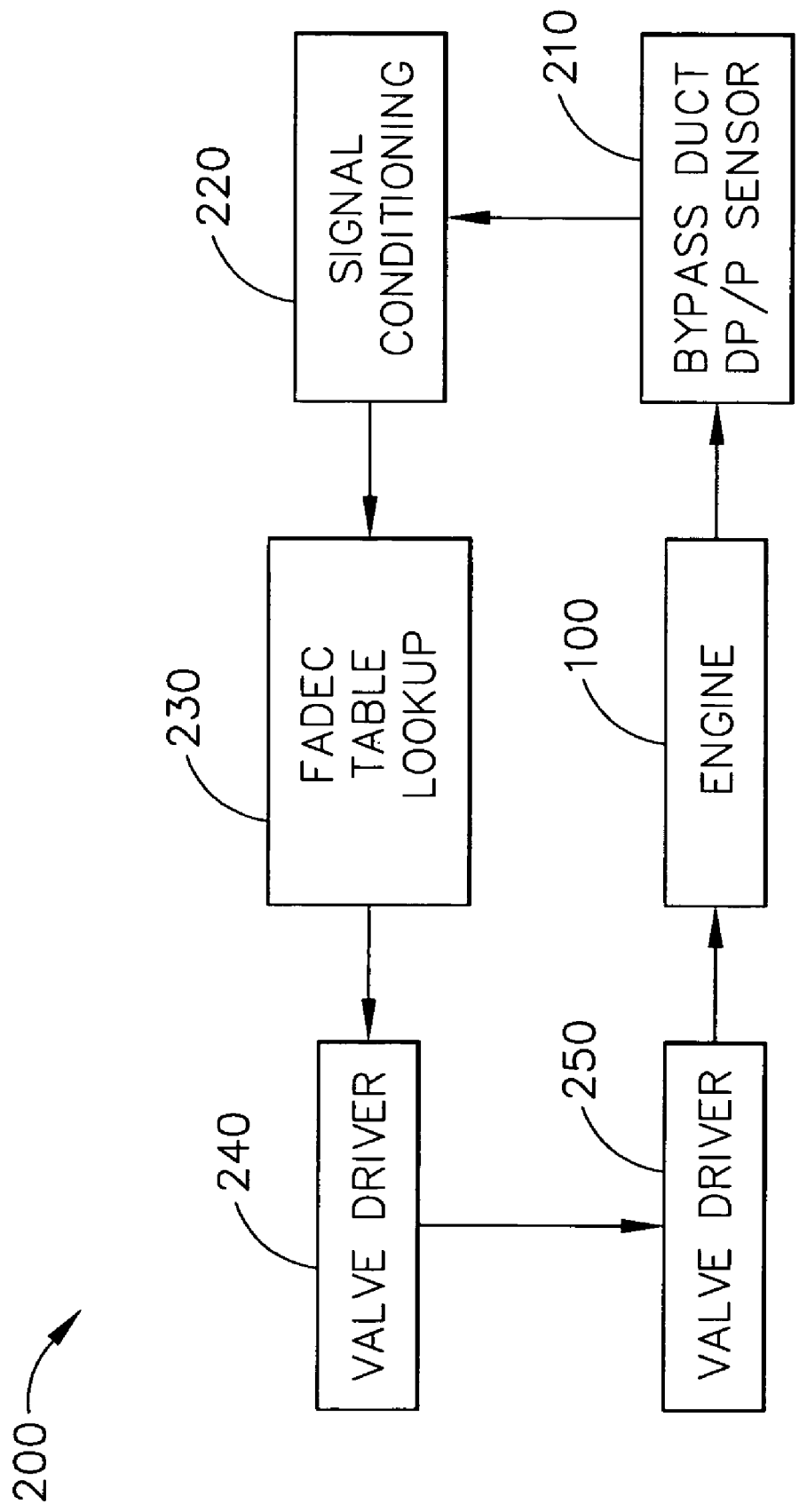
FIG. 4 is a schematic illustration of a control system for controlling the recirculation of gas into the gas turbine engine.

A control system 200 to effect operating line control using recirculated gas is shown in FIG. 4. This is the preferred means of controlling the fan flow recirculation system shown in FIG. 3. Central to this control system is the recirculation flow valve 125 shown in FIG. 2 and FIG. 3. The recirculation valve 125 controls the amount of gas that is extracted by the bleed system 140 and the amount of gas that is reintroduced by the recirculation system 145.

The preferred embodiment for the control system used in FIG. 2 and FIG. 3 is a closed-loop feedback control system as shown in FIG. 4. This control system comprises a sensor 210, a signal conditioner 220, a Full Authority Digital Electronic Control ("FADEC") program, and valve drivers 240, 250 which control the amount of gas extracted and reintroduced, all of which are coupled to the engine 100. The input signal for this control system can be derived from any suitable sensors for flow parameters from the compression system, such as for example, from the bypass duct Mach number sensor measurement labeled as DP/P in FIG. 4. This signal is indicative of fan operating line and can be used, after processing by a suitable signal conditioner 220, by the digital engine control FADEC 230 to calculate a demand valve position needed and control the valve drivers 240, 250 to ensure a minimum fan stall margin at all times. In conventional design engines the DP/P signal is used to modulate a variable area nozzle aperture, whereas in the present invention, the signal is used to control the flow extraction and recirculation systems, such as for example, shown in FIG. 2 and FIG. 3.

In the case where a fixed-area exhaust nozzle is fitted, this control loop can be used for active control of the recirculation system at the minimum possible incremental cost. Modulation of the flow extraction and recirculation flows for purposes of controlling operating line of a compressor 160 can also be scheduled using conventional engine sensors such as the compressor discharge static pressure and fuel flow sensors used in conventional engine control systems. The preferred implementation for a compressor is to schedule the recirculation bleed to ensure that the ratio of fuel flow to compressor discharge static pressure does not exceed a predetermined threshold, again using a table lookup implementation in a digital engine control FADEC 230 shown in FIG. 4.

In operation of the preferred embodiment shown in FIG. 2, when the controlling valve 125 is opened so as to allow recirculation of flow the operating lines, such as for example 14 in FIG. 1, of both the fan 150 and compressor 160 will be lowered. The fan 150 operating line is lowered because the gas reintroduced by the recirculation system 145 tends to displace some of the inlet gas that would otherwise have been drawn in by the fan 150. Thus, although the fan 150 is compressing and flowing the same amount of flow as for the non-bleed case, the total flow rate that must be passed by the downstream nozzle 145 throat 146 has decreased, thereby lowering the fan operating line.

Figure 5:
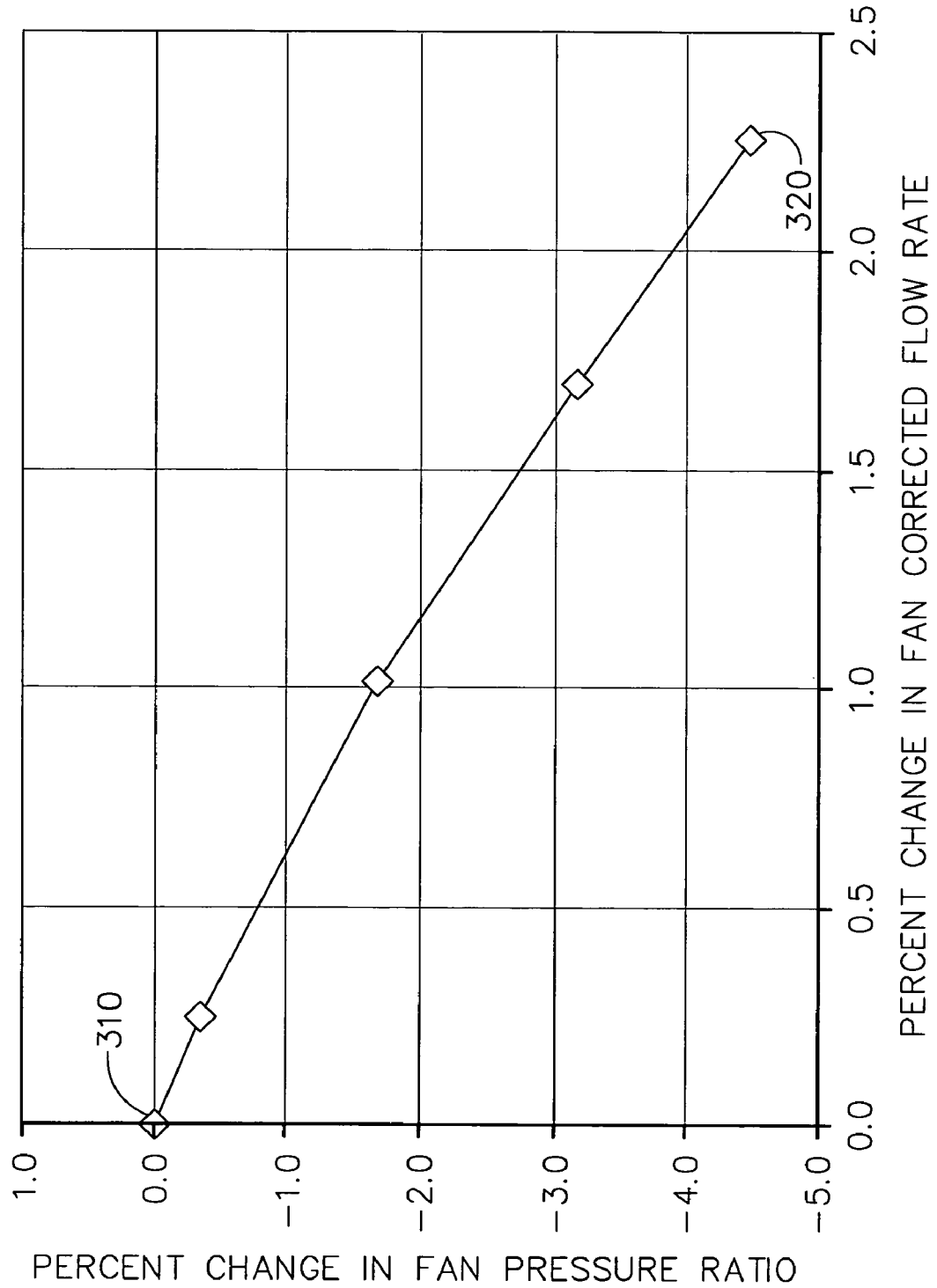
FIG. 5 is a plot of the shift in fan operating point according to the present invention when the amount of bleed is varied.
Figure 6:
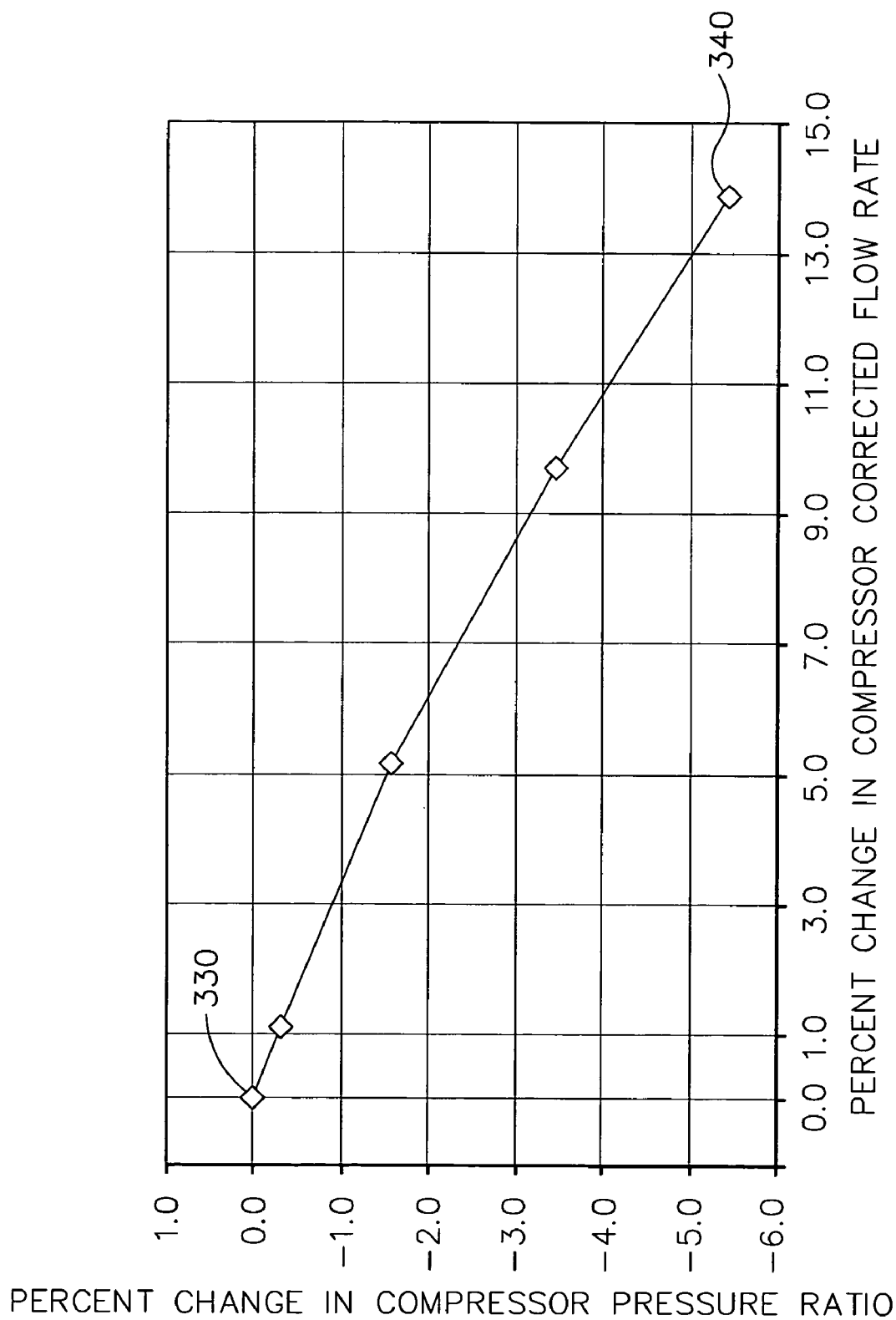
FIG. 6 is a plot of the shift in compressor operating point according to the present invention when the amount of bleed is varied.

FIG. 5 shows a plot of shift in a fan operating point along a constant speedline. This plot shows shift in operating line as a percent difference from a baseline point 330 with no bleed flow. Fan corrected speed is being held constant in this case and bleed is being varied over the range of no recirculation (item 310 in FIG. 5) to about 15% of fan flow recirculation (item 320 in FIG. 5). Note that the fan operating line shifts down and to the right as recirculation flow rate is increased. A similar plot of shift in a compressor operating point is shown FIG. 6.

Figure 7:
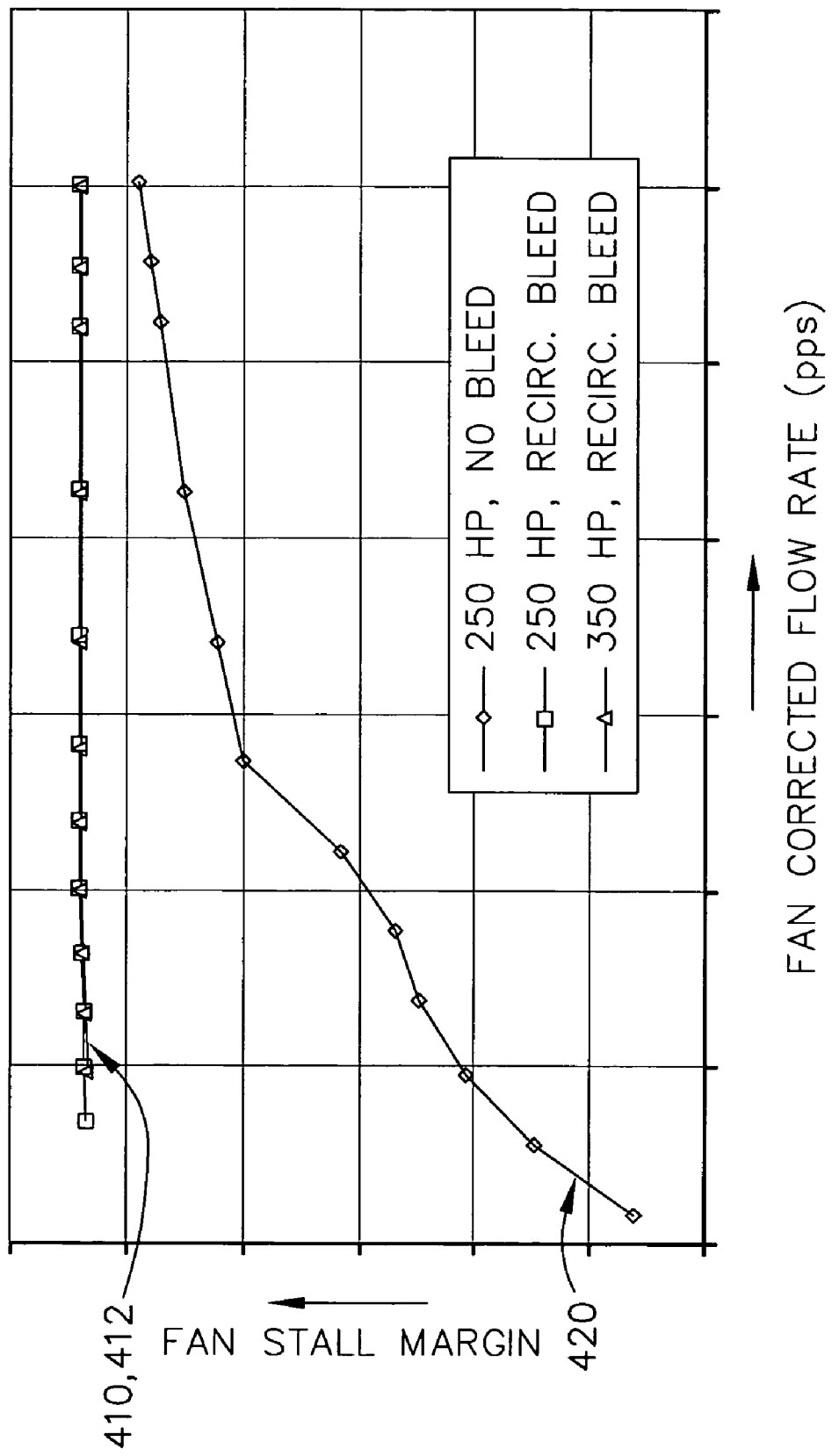
FIG. 7 is an exemplary result of increased stall margin according to the present invention in the presence of auxiliary power extraction.

FIG. 7 shows that increased stall margins can be obtained using flow recirculation systems, such as shown in FIG. 2 and FIG. 3. In FIG. 7, item 420 shows the reduction in stall margin at low fan corrected flow conditions in the presence of auxiliary power extraction of 250 hp. Using flow recirculation the stall margin can be maintained thought a large range of the fan corrected flow rate variations and in the presence of larger auxiliary power extraction (items 410, 412).

While the invention has been described in terms of various specific embodiments, those skilled in the art will recognize that the invention can be practiced with modification within the spirit and scope of the claims.

What is claimed is:

1. A system for controlling the operating lines of a compression system comprising:
    a compression system which compresses an incoming flow of a gas;
    a bleed system which extracts gas from a bleed location;
    a recirculation system which reintroduces at least a portion of the gas extracted by the bleed system at a feed location located upstream from the bleed location;
    a control system which controls the recirculated gas such that the operating line of the compression system is changed whereby the stall margin of the compression system is increased.

2. A system according to claim 1 wherein the control system is a feedback control system comprising:
    a sensor for sensing a flow parameter, a digital controller and recirculation valve.

3. A system according to claim 2 wherein the recirculation valve is a modulating valve capable of modulating the amount of gas reintroduced.

4. A system according to claim 1 wherein the a recirculation system reintroduces at least a portion of the gas extracted by the bleed system at a plurality of feed locations along a strut located upstream from the compression system.

5. A system according to claim 1 wherein the recirculation system reintroduces at least a portion of the gas extracted by the bleed system at a plurality of feed locations in a casing located upstream from the compression system.

6. A compression system for compressing a gas comprising:
    an axial compressor having a plurality of compression stages;
    a bleed means for extracting gas from a bleed location;
    a recirculation means for reintroducing at least a portion of the gas extracted by the bleed means at a feed location located upstream from the bleed location;
    a control means for controlling the amount of gas recirculated such that the operating line of the compression system is changed whereby the stall margin of the compression system is increased.

7. A compression system according to claim 6 wherein the control means is a feedback control system comprising:
    a sensor for sensing a flow parameter, a digital controller and recirculation valve.

8. A compression system according to claim 7 wherein the recirculation valve is a modulating valve capable of modulating the amount of gas reintroduced.

9. A compression system according to claim 6 wherein the recirculation means reintroduce at least a portion of the gas extracted by the bleed means at a plurality of feed locations along a strut located axially forward from the first stage of the axial compressor.

10. A compression system according to claim 6 wherein the recirculation means reintroduce at least a portion of the gas extracted by the bleed means at a plurality of feed locations in a casing located upstream from the compression system.

11. A gas turbine engine comprising:
    a fan that pressurizes at least a portion of the incoming air and flows it into a bypass stream;
    a compressor that compresses at least a portion of the incoming air;
    a bleed means for extracting air from a bleed location;

a recirculation means for reintroducing at least a portion of the air extracted by the bleed means at a feed location located upstream from the bleed location;

a control means for controlling the amount of air recirculated by the recirculation means such that the operating line of the fan is changed whereby the stall margin of the fan is increased.

12. A gas turbine engine according to claim 11 wherein the bleed location is located in the fan flow stream.

13. A gas turbine engine according to claim 11 wherein the bleed location is located in the compressor flow stream.

14. A gas turbine engine according to claim 11 wherein the recirculation means reintroduce at least a portion of the air extracted by the bleed means at a plurality of feed locations along a strut located upstream from the compressor.

15. A gas turbine engine according to claim 11 wherein the recirculation means reintroduce at least a portion of the air extracted by the bleed means at a plurality of feed locations in a casing located upstream from the compressor.

16. A gas turbine engine comprising:
    a fan that pressurizes at least a portion of the incoming air and flows it into a bypass stream;
    a compressor that compresses at least a portion of the incoming air;
    a bleed means for extracting air from a bleed location;
    a recirculation means for reintroducing at least a portion of the air extracted by the bleed means at a feed location located upstream from the bleed location;
    a control means for controlling the amount of air recirculated by the recirculation means such that the operating line of the compressor is changed whereby the stall margin of the compressor is increased.

17. A gas turbine engine according to claim 16 wherein the bleed location is located in the fan flow stream.

18. A gas turbine engine according to claim 16 wherein the bleed location is located in the compressor flow stream.

19. A method of controlling a gas turbine engine comprising the steps of:
    raising the pressure of a gas entering the engine using a compression system;
    extracting a portion of the gas from a bleed location in the engine;
    reintroducing at least a portion of the gas extracted from the bleed location at a feed location upstream from the bleed location;
    controlling the amount of the gas reintroduced such that the operating line of the compression system is changed whereby the stall margin of the compression system is increased.

20. A method of controlling a gas turbine engine according to claim 19 wherein the step of controlling the amount of gas reintroduced is done by modulating the gas flow using a modulating valve.

* * * * *